Figure 1:
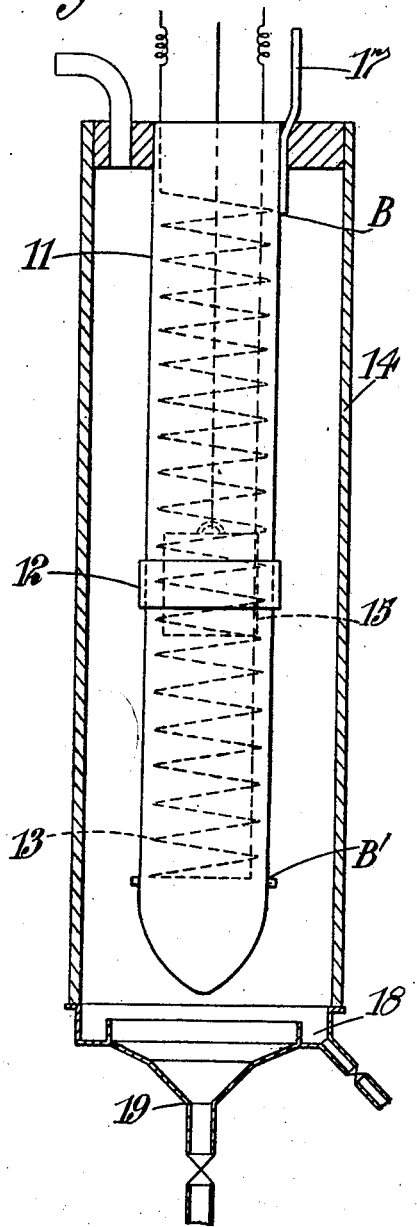

Dec. 31, 1957     C. OCKRENT     2,818,373
APPARATUS FOR VACUUM DISTILLATION
Filed April 4, 1955                                  2 Sheets-Sheet 2
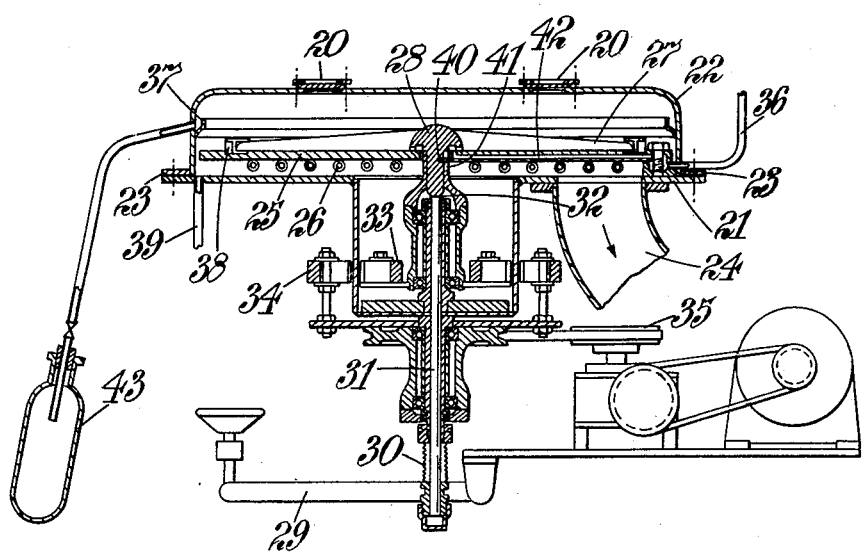
INVENTOR
CHARLES OCKRENT
BY    *Bacon & Thomas*
ATTORNEYS United States Patent Office 2,818,373
Patented Dec. 31, 1957

2,818,373

APPARATUS FOR VACUUM DISTILLATION

Charles Ockrent, London, England, assignor to The British Drug Houses Limited, London, England, a British company Application April 4, 1955, Serial No. 499,169

15 Claims. (Cl. 202—205)

This invention is for improvements in or relating to methods and apparatus for vacuum distillation and has particular reference to methods and apparatus for the moving film molecular distillation of liquids.

Many types of apparatus for moving film type distillations under high vacuum have previously been proposed. This type of distillation is commonly referred to as "molecular distillation." Originally the distribution and movement of the material in the form of a film was effected by gravity, but under these conditions diffusion of the molecules from the interior of the distilland to the evaporating surface is slow, especially with viscous liquids, and the film is uneven and discontinuous, and in some substances, such as vitamin oils, because of hold-up of the distilland, charring may occur on the heated evaporating surface. Several forms of apparatus have been proposed to avoid these difficulties. In some cases thin even films have been obtained by applying centrifugal force, by means of rotation of the evaporating surface carrying the film; in others spreading of the liquid by mechanical means has been employed. These different forms of apparatus have considerable mechanical complexity, and have the disadvantage that the actuating mechanism may have to be carried in the high vacuum compartment.

It is an object of the present invention to provide an improved method and apparatus for high vacuum moving film distillation which method and apparatus provide simple and effective means for the continual exposure of fresh surfaces of the distilland throughout the distilling operation and for the removal of any charred material.

According to the present invention there is provided a method of moving film molecular distillation which comprises moving the distilland upon the heated surface by means of a scraper moved by magnetic or electromagnetic means. The magnetic or electromagnetic means is preferably exterior to the high vacuum distilling vessel.

Further, according to the present invention there is provided apparatus for carrying out the above-mentioned method which apparatus comprises a high vacuum distilling vessel, a surface from which distillation of the liquid takes place, a scraper movable by magnetic or electromagnetic means over the surface and means exterior to the high vacuum distilling vessel to move the scraper over the surface.

The distilling surface may take the form e. g. of a disc, a rectangular plate or a cylindrical tube. It may be made for example of aluminium, copper or brass which may be plated if desired e. g. with silver, chromium or gold.

In one form of the apparatus the distilling surface may be circular and the scraper may consist of a swinging steel-tipped arm rotated by magnetic means. The scraper can of course have one or more arms. The efficiency with which the distilland is spread over the distilling surface may be increased by attaching to the arms of the scraper flexible strips of material such as aluminium. These strips not only give more intimate contact with the distilling surface, but also allow for any distortion of the distilling surface, for example by thermal expansion. The flexible strips can be allowed to operate by gravity or they can be spring-loaded. When flexible strips are used the arms of the scraper can simply be used to provide the driving force of the flexible strips. A hollow boss carrying the scraper may be provided with radial ducts so that it acts as a centrifugal pump to spread liquid evenly on to the distilling surface.

The magnetic means for moving the scraper over the distilling surface may comprise a ring of automatically actuated electromagnets or one or more moving permanent magnets situated outside the evacuated distilling vessel.

The distilland film itself acts as a lubricant so that the scraper moves more freely over the surface than otherwise and thus responds more exactly to the applied magnetic force.

In another form of the distilling apparatus the distilling surface is constituted by the outer surface of a vertically disposed heated cylinder and the scraper may then take the form of a ring surrounding and sliding freely or in guides upon the cylinder.

The plate or cylindrical column may be heated by electricity, steam or hot liquid circulation thermostatically controlled or by infra-red radiation.

When a plate is employed as the heating surface it may be horizontally disposed or inclined at any desired angle.

The distillate may conveniently be collected as it drains from the inner surface of the evacuated vessel in an annular channel at the bottom of the vessel while one or more separate channels may be provided to receive and lead away distilland removed from the distilling surface by the scraper. This distilland may if desired be recirculated to the distilling surface. By raising the temperature of this surface various fractions may be removed.

Following is a description by way of example and with reference to the accompanying drawings of methods of carrying the invention into effect.

In the drawings:

Figure 1 is a section elevation of a distilling apparatus according to the invention, while Figure 2 is a central vertical sectional elevation of a still according to the invention.

*Example I*

Referring to Figure 1 a hollow cylindrical column 11 the outer surface of which constitutes the distilling surface is constructed in some nonmagnetic metal such as, for example, aluminium, brass or copper. The column is surrounded by a closely fitting but freely sliding steel ring 12. The column and ring may be plated if necessary or desirable with silver, chromium or gold.

The column is heated internally by electricity 13, steam, or hot liquids circulation thermostatically controlled, or by infra-red radiation. The interior of the column is at atmospheric pressure. The whole unit is enclosed in an air or water-cooled tube 14. This tube may be of glass, the interior of which is evacuated to a high vacuum.

The steel ring 12 is caused to reciprocate over the heated surface by means of a permanent magnet 15 or electromagnets automatically actuated may be substituted for the permanent magnet.

The magnets can be reciprocated mechanically by an external mechanism. The speed of reciprocation is adjusted, by either gearing or rheostats, to meet the material being distilled.

A stop $B^1$, is fitted at the base of the column and the ring moves between the points B—$B^1$. The distilland is introduced through a tube at the top of the column 17.

The distillate condenses on the interior of the glass-cooled tube and is collected in an annular channel 18, The distillate so obtained may be removed as a series of fractions if desired by any of the well-known methods of collection under vacuum.

The residue falls from the column into a funnel 19 and thence passes to a suitable receiver and may be recirculated for repeated distillation if desired after removal of any charred material, the whole system being maintained under a pressure of the order of $1\mu$.

The distance from the distilling surface to the condensing surface should be such that it is not greater than the mean free path. The movement of the ring over the distilling surface results in an even film being obtained and continually produces new distilling surfaces. The number of distilling surfaces depends on the rate of reciprocation. Further if any slight charring does occur, this is prevented from building up by the moving scraper.

*Example II*

Apparatus employed in this example consists of a rectangular plate constructed of aluminium or other non-magnetic metal, which may be plated, if desired. This plate may be horizontal or inclined at any desired angle. Across this plate is fitted a steel scraper mounted in guides so as to move freely from end to end of the plate. The scraper can be moved either by a moving permanent magnet or by electromagnets automatically actuated. The plate is heated by electricity or hot liquid, the condensing surface being constituted by a cover over the metal plate. The distilland is fed to the center or edges of the plate, and the feeding may be synchronised with the movement of the magnet, and distribution is effected by the scraper. The distillate flowing from the condensing surface is collected in an annular channel surrounding the plate, and is transferred from thence to a receiver. The residue from the distilland is collected in two channels one at each end of the plate, and is directed into receivers.

*Example III*

Referring to Figure 2, is still for molecular distillation made of a suitable non-magnetic metal such as stainless-steel, brass or aluminium consists of a body constructed in two portions. The bottom portion 21 carries a distilling plate and rotating mechanism while the top portion 22 which may be fitted with inspection glasses 20 acts as the condensing surface for the distillate. The top and bottom portions are joined at smooth faces 23 which are further sealed by suitable jointing material and bolted together. This joint may be water-cooled if so desired.

The bottom portion 21 also has fitted a large pipe 24 for evacuating the still. A circular distilling plate 25 is plane and is made of brass heavily plated with silver, gold, or chromium. The distilling plate 25 is heated by electricity by means of heating elements 26. A single or multi-bladed scraper 27 rests on the surface of the distilling plate 25. The scraper 27 may carry flexible strips to follow any inequalities of the plate surface caused by thermal expansion.

The scraper is fitted with a cowl 28 to prevent any splashing of the distilland as it is fed onto the distilling plate 25. The scraper 27 may be lowered by an adjusting arm 29 which operates on bellows 30 and raise or lower rod 31, providing a bearing 32 for scraper boss. Rotation of the scraper 27 is effected by permanent magnets 33 carried on a framework mounted in bearings inside the vacuum chamber. These magnets 33 are opposed by adjacent magnets 34 outside the chamber. Rotation of magnets 34 by mechanical means 35 imparts motion to magnets 33. The rotating force available may be increased as desired by increasing the number of magnets. The rotating mechanism engages the scraper 27 via a pin 40 which is free to slide in a vertical slot 41 in the rotating device.

The distilland is admitted through a pipe 36. A positively acting variable speed metering pump (not shown) may be used to feed a controlled amount of distilland to the plate. The orifice of pipe 36 is in line with a conduit 42 through the plate 25 and emerges at the center spindle of the scraper under the cowl 28. In passing through the conduit 42 the distilland is brought to approximately the same temperature as the surface of the plate 25. The distilland is distributed by centrifugal pump action on to the plate 25 and is then spread over the distilling area of the plate by the blades of the scraper. The distillate collects on the air-cooled condensing surface of the top portion 22 of the still and runs down into a channel 37 where it is removed to suitable containers such as 43. The residue is collected by a kerb 38 and is allowed to drain to the bottom of the vacuum vessel through a hole in the kerb and is led away by a pipe 39. The whole still may be either horizontal or may be downwardly inclined towards the outlets for distillate and residue at any angle to the horizontal desired, but is preferably inclined at an angle of 5 to 10°. Instead of being heated electrically, the plate may be heated by liquid.

*Example IV*

The apparatus of this example is substantially the same as that described in Example III but the scraper is actuated by a permanent magnet which is revolved under the outer end of the scraper by a fixed or variable speed motor operated e. g. through gearing. The scraper on the upper surface of the heated evaporating plate, in the evacuated chamber, as in Example III, revolves under the magnetic force exerted by the permanent magnet moving exterior to the evacuated chamber and underneath the plate.

It will be understood that a number of modifications may be made in the mechanical details described above in order to achieve the desired result.

I claim:

1. Apparatus for moving film molecular distillation comprising: means defining a sealed chamber adapted to be evacuated; a stationary distilling surface within said chamber; means for heating said surface; a condensing surface within said chamber in spaced, relatively close relation to said distilling surface; means for feeding distilland to said distilling surface; a first member within said chamber comprising a wiper for said distilling surface; a second member outside said chamber, at least one of said members being a magnet and the other member being attracted thereto; and means moving said second member to cause said wiper member to move over said distilling surface and distribute a thin film of distilland thereon.

2. The apparatus of claim 1 in which said magnet is a permanent magnet.

3. The apparatus of claim 1 in which said magnet is an electromagnet.

4. The apparatus of claim 1 in which said means moving said second member is continuously operated.

5. The apparatus of claim 1 in which said wiper has a flexible edge portion for following irregularities in said distilling surface.

6. The apparatus of claim 1 in which said distilling surface is a planar surface and said wiper is an elongated arm.

7. The apparatus of claim 1 in which said distilling surface is cylindrical and said wiper is a ring surrounding said surface and slidable thereover.

8. Apparatus for moving film molecular distillation, comprising: a first cylindrical member closed at its lower end, the inner surface of said member constituting a condensing surface; a second cylindrical member closed at its lower end and open at its upper end fixedly positioned coaxially within said first cylindrical member, the outer surface of said second cylindrical member constituting a distilling surface; means sealing the space between said first and second cylindrical members adjacent their upper ends to provide a sealed chamber adapted to be evacuated; means for heating said distilling surface; means for feeding distilland to said distilling surface; a first element comprising a ring surrounding said second cylindrical member and slidable thereon; a second element positioned within said second cylindrical member exteriorly of said sealed chamber, at least one of said elements being a magnet and the other element being attracted thereto; and means reciprocating said second element within said second cylindrical member to cause said ring element to travel along said distilling surface and wipe a thin film of distilland thereon.

9. The apparatus of claim 8 in which said second element is a permanent magnet.

10. The apparatus of claim 8 in which said means reciprocating said second element is continuously operated.

11. Apparatus for moving film molecular distillation, comprising: means defining a sealed chamber adapted to be evacuated, said means including a generally circular base portion, a dome portion overlying said base portion, and a depending cup portion secured to said base portion in coaxial relation therewith, the inner surface of said dome portion constituting a condensing surface; a centrally apertured disc fixedly mounted within said chamber and having its upper surface constituting a distilling surface in opposed, spaced relation to said condensing surface; a rotatable post journaled in said cup portion coaxial therewith and projecting upwardly through the central aperture in said disc; means for feeding distilland to said distilling surface at a point adjacent said post; at least one radially extending wiper arm for said distilling surface secured to the upper end of said post; a first member secured to said post within said cup portion closely adjacent the walls thereof; a second member mounted outside said cup portion in opposed relation to said first member for movement about an axis coinciding with the axis of said post, at least one of said members comprising a magnet and the other member being attracted thereto; and means for moving said second member to cause said wiper arm to distribute a thin film of distilland over said distilling surface.

12. The apparatus of claim 11 in which said post is vertically adjustable to raise and lower said wiper arm.

13. The apparatus of claim 11 in which said wiper arm is provided with a flexible strip to follow any irregularities in the distilling surface.

14. The apparatus of claim 11 in which both said first and second members comprise permanent magnets.

15. The apparatus of claim 11 in which said means for moving said second member is continuously operated.

References Cited in the file of this patent

UNITED STATES PATENTS

| | | |
|---|---|---|
| 2,109,129 | Fawcett et al. | Feb. 22, 1938 |
| 2,180,053 | Hickman | Nov. 14, 1939 |
| 2,313,175 | Scott et al. | Mar. 9, 1943 |
| 2,539,699 | Perry et al. | Jan. 30, 1951 |
| 2,613,176 | Goldsbarry et al. | Oct. 7, 1952 |